Oct. 7, 1924.  
F. A. SEBENSTE  
VALVE  
Filed Feb. 12, 1923
1,510,528
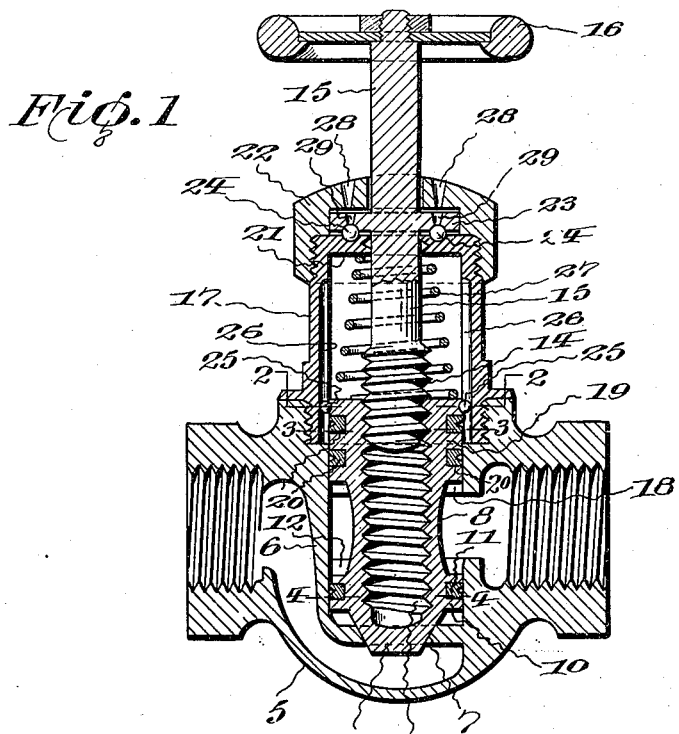
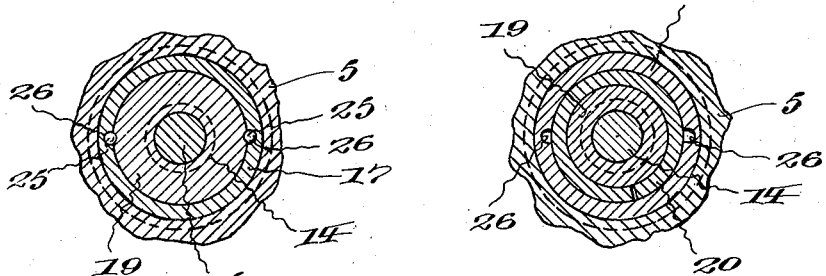
Inventor:  
F. A. Sebenste.  
By Milo B. Stevens & Co.  
Attorneys.

Patented Oct. 7, 1924.

1,510,528

UNITED STATES PATENT OFFICE.

FRED A. SEBENSTE, OF HAMMOND, INDIANA, ASSIGNOR OF ONE-HALF TO GEORGE A. CRAWFORD, OF HAMMOND, ILLINOIS.

VALVE.

Application filed February 12, 1923. Serial No. 618,619.

*To all whom it may concern:*

Be it known that I, FRED A. SEBENSTE, a citizen of the United States, residing at Hammond, in the county of Lake and State of Indiana, have invented new and useful Improvements in Valves, of which the following is a specification.

The valve which is the subject matter of the present application for patent has been designed to effectually prevent leakage past the same of the fluid which it is to control, and also to prevent leakage along the valve stem.

A further object of the invention is to provide a valve which is easy to operate, and simple in construction, its parts being so arranged that they can be readily disconnected for repairs.

The invention also has for its object to provide a valve the closing movement of which is cushioned so that it cannot injure the seat by being violently jammed or forced thereagainst.

Other objects and advantages of the invention will be pointed out in the detailed description appearing hereinafter.

In order that the invention may be better understood, reference is had to the accompanying drawings, wherein,—

Figure 1 is a central vertical section of the valve, and

Figs. 2, 3, and 4 are cross-sections on the lines 2—2, 3—3 and 4—4, respectively, of Fig. 1.

Referring specifically to the drawing, 5 denotes a globe valve casing of conventional design containing a partition 6 dividing the inlet of the casing from the outlet thereof, said partition having a port 7, which latter, when it is open establishes communication between the casing inlet and the outlet, and when closed shuts off the flow through the casing.

The valve controlling the port 7 is a plug 8 having a tapered extremity 9 to enter the port, the latter having a corresponding taper so that a tight closure may be effected. Adjacent to the tapered extremity of the plug, the latter is formed with a piston head 10 having a peripheral groove in which is mounted a resilient packing ring 11. That portion of the partition 6 which contains the port 7, is formed on one side of the latter with a dash-pot 12 which is adapted to be entered by the piston head 10 when the valve part 9 starts to enter the port 7, thereby cushioning the closing movement of said part so that it cannot mar or injure the seat by being violently jammed or forced closed. The packing ring 11 is in contact with the wall of the dash-pot 12 when the valve part 9 is seating in the port 7, which effectually prevents leakage even if the seating is not perfect. Leakage can occur only when the seating contact of the packing ring with the wall of the dash-pot becomes defective, and the defect can then be readily cured by applying a new ring. Regrinding of valve, which is an expensive job, is not necessary, and a new well-fitting ring again makes the valve leak-proof.

The valve body 8 has a central longitudinal bore 13 which is screw-threaded and receives the threaded inner end 14 of a valve stem 15 having its outer end fitted with a hand wheel or other handle 16. The valve body is non-rotatable, but freely slidable in the direction of its length, whereas the valve stem is a non-traveling screw. It will therefore be evident that the valve body is moved to and from seating position by rotating the valve stem in one or the other direction according to whether the valve is to be seated or unseated.

The valve casing 5 has a bonnet 17 through which the valve stem 15 passes, and where the bonnet is connected to the valve casing, the latter is formed with a cylindrical chamber 18 of which the bonnet is a continuation. The valve body 8 has a cylindrical head 19 which seats slidably in the chamber 18 and also extends partly in the bonnet 17. The head 19 has a pair of peripheral grooves in which are mounted resilient packing rings 20 which are in contact with the wall of the chamber 18 and the bonnet 17, for the purpose of preventing leakage of any fluid into the bonnet and past the valve stem 15, so that it will not be necessary to provide a packing for the latter.

The outer end of the bonnet 17 is closed, as shown at 21, and also here fitted with a screw cap 22 which is spaced from said end. The bonnet end 21 and the cap 22 are centrally apertured to let the valve stem 15 through, and between said parts 21 and 22, the valve stem has an outstanding collar 23 whereby longitudinal travel of the valve stem is prevented. Between the collar 23 and the bonnet end 21 are interposed anti-friction balls 24 to facilitate operation of the valve stem, and reduce friction and wear.

To prevent rotation of the valve body 8, the head 19 has one or more peripheral seats for a corresponding number of balls 25, which latter extend part-way into longitudinal grooves 26 in the interior surface of the bonnet 17.

Between the valve body head 19 and the bonnet end 21 is interposed a coiled spring 27. The purpose of this spring is to constantly urge the valve stem 15 inwardly, and thereby maintain the threaded connection between the valve stem and the valve body 8 firm and tight, without, however, holding it so tight as to make the turning of the valve stem difficult. Any lost motion from wear is automatically taken up by the spring.

In order that the ball-bearing 24 may be lubricated, the cap 22 has oil holes 28 which register with oil holes 29 in the collar 23. The packing rings 11 and 20 are provided with peripheral grooves adapted to hold a lubricant, such as hard grease.

As the valve 8 moves longitudinally and does not rotate it is not necessary to grind the same in originally or at any time thereafter. As the tapered portion 9 of the valve is not screwed or turned down against the seat, there is no chance of cutting either the seat or the valve and consequently the valve and the seat will not rapidly wear or become leaky.

I claim:

A valve comprising a casing containing a port, a reciprocatory non-rotating valve for said port, a rotatable non-traveling valve-operating stem having a threaded connection with the valve, a bonnet for the casing, said bonnet being closed at its outer end, a cap over said bonnet end, the valve operating stem passing through the bonnet end and the cap and having a collar therebetween, and anti-friction balls between the collar and the bonnet end, said collar and the cap having lubricant passageways leading to the anti-friction balls.

In testimony whereof I affix my signature.

FRED A. SEBENSTE.